Patented Nov. 6, 1945

2,388,529

UNITED STATES PATENT OFFICE 2,388,529

DERIVATIVES OF AMINOBENZENE-SULPHONAMIDES

Gaetano F. D'Alelio and James J. Pyle, Pittsfield, Mass., assignors to General Electric Company, a corporation of New York No Drawing. Application June 7, 1943,
Serial No. 489,954

11 Claims. (Cl. 260—397.7)

This invention relates to new chemical compounds and more particularly to derivatives of aminobenzenesulphonamides. Specifically, the invention is concerned with the production of new and useful cyanoaminobenzenesulphonamides.

The chemical compounds of this invention are embraced by the following general formula:

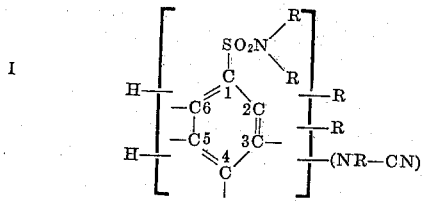

I where R is a member of the class consisting of hydrogen and monovalent hydrocarbon radicals. Illustrative examples of monovalent hydrocarbon radicals that R in the above formula may represent are: aliphatic (e. g., methyl, ethyl, propyl, isopropyl, allyl, butyl, sec.-butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, etc.); and aryl-substituted aliphatic (e. g., benzyl, phenylethyl, phenylpropyl, cinnamyl, etc.). Preferably R represents hydrogen.

Although compounds such, for instance, as sulphanilylcyanamide in which the cyano group is attached to the nitrogen atom of the sulphonamide group are known, the compounds of the present invention are distinguished from such known compounds by the fact that the cyano group is attached directly to the nitrogen atom of the amino group.

Our new sulphonamide derivatives may be used as chemotherapeutic agents and, also, as intermediates in the preparation of derivatives thereof such, for instance, as carbamyl, thiocarbamyl, imido ether, amidine, acyl, ureido, hydrazino, etc., derivatives of the individual sulphonamides embraced by Formula I. These new compounds and certain derivatives thereof are especially valuable in their use as plasticizers or as curing reactants for aminoplasts (e. g., urea-formaldehyde resins, melamine-formaldehyde resins, etc.) and other resinous bodies and molding compounds produced therefrom that have unsatisfactory plasticity or flow characteristics. They also may be used as a plasticizer for thermoplastic resins and for adjusting the pH of phenolic casting resins prior to dehydration. Aldehyde-reactable compounds of the invention or aldehyde-reactable derivatives thereof may be condensed with, for instance, aldehydes, including polymeric aldehydes and aldehyde-addition products to yield condensation products having particular utility in the plastics and coating arts.

Various methods may be employed to produce the chemical compounds embraced by Formula I. We prefer to prepare them by effecting reaction between (1) a sulphonamide corresponding to the general formula

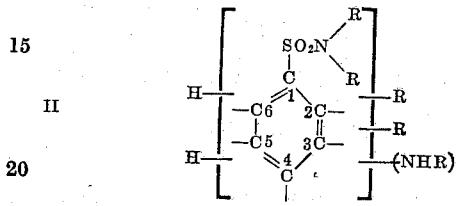

II where R has the same meaning as given above with reference to Formula I, and (2) a cyanogen halide (cyanogen chloride, cyanogen bromide, cyanogen fluoride, cyanogen iodide), the said reaction preferably being effected in the presence of a hydrohalide acceptor. Illustrative examples of sulphonamides embraced by Formula II that may be used, depending upon the particular end product desired, are as follows:

Sulphanilamide (p-aminobenzenesulphonamide; 4-aminobenzenesulphonamide)
2-methyl sulphanilamide
2-ethyl sulphanilamide
2-allyl sulphanilamide
3-methyl sulphanilamide
3-ethyl sulphanilamide
2,3-dimethyl sulphanilamide
2,3-diethyl sulphanilamide
2-methyl 3-ethyl sulphanilamide
2-ethyl 3-methyl sulphanilamide
2-aminobenzenesulphonamide (o-aminobenzenesulphonamide)
3-aminobenzenesulphonamide (m-aminobenzenesulphonamide)
2-amino 3-methyl benzenesulphonamide
2-amino 4-methyl benzenesulphonamide
2-methyl 3-amino-benzenesulphonamide
3-amino 4-methyl benzenesulphonamide
2-amino 3,4-dimethyl benzenesulphonamide
2-amino 3,4-diethyl benzenesulphonamide
3-amino 2,4-dimethyl benzenesulphonamide
3-amino 2,4-diethyl benzenesulphonamide
2-phenyl sulphanilamide 2-cyclohexyl sulphanilamide
2-butenyl sulphanilamide
2-ethyl 3-isopropyl sulphanilamide
3-methyl 4-methylamino benzenesulphonamide
2,6-dipropyl 4-isoamylamino benzenesulphonyl-methylamide
4-amino benzenesulphonyl-(dimethyl)-amide
3-butenyl 5-phenyl 4-ethylamino benzenesulphonamide
2-tolyl 5-cyclohexenyl 4-propylamino benzenesulphonamide
3-isobutyl 5-methyl 4-amylamino benzenesulphonyl-ethylamide
2-phenyl 6-methyl sulphanilamide
2-phenyl 3-amino benzenesulphonamide
3-amino 4-xenyl benzenesulphonamide
2-methylamino benzenesulphonamide
2-phenylamino benzenesulphonamide
3-phenylamino benzenesulphonyl-(diethyl)-amide
3-ethylamino 4-methyl benzenesulphonamide
2-propylamino 3-ethyl benzenesulphonamide
2-phenylamino benzenesulphonyl-methylamide
2-phenyl 6-methyl sulphanilamide
3-ethyl 4-isopropyl 5-amino benzenesulphonamide
2,6-dimethyl 4-benzylamino benzenesulphonyl-(diphenyl)-amide
3-isopropyl 4-ethylamino benzenesulphonyl-cyclohexylamide
3,5-dimethyl 4-amino benzenesulphonyl-benzylamide
3-phenyl 4-amino benzenesulphonyl-tolylamide
3-phenylethyl sulphanilamide
2-tolyl sulphanilamide
3-phenylethyl 4-allylamino benzenesulphonyl-propylamide
2-isoamyl 5-naphthyl sulphanilamide
2,6-dihexenyl 4-amylamino benzenesulphonyl-ethylamide
2-amino 3-methyl 4-ethyl benzenesulphonamide
2-cinnamyl sulphanilamide We prefer to use sulphanilamide or ortho- or meta-aminobenzenesulphonamide as a starting reactant.

Illustrative examples of hydrohalide acceptors that may be used are the inorganic bases, e. g., the alkali-metal hydroxides (sodium hydroxide, potassium hydroxide, etc.), calcium hydroxide, barium hydroxide, etc., the carbonates of such bases, and the organic bases, for instance, trimethyl amine, tributyl amine, dimethyl aniline, pyridine, quinoline, a sulphonamide of the kind embraced by Formula II (numerous examples of which have been given above), etc., quaternary ammonium bases (e. g., tetramethyl ammonium hydroxide, etc.), and the like. We prefer to use an excess of the sulphonamide reactant as the hydrohalide acceptor.

For economic reasons and because of their availability, we prefer to employ cyanogen bromide or cyanogen chloride as the cyanogen halide reactant.

The reaction between the amino (—NHR) benzenesulphonamide and the cyanogen halide may be carried out in any suitable manner, but preferably is effected in the presence of a liquid medium, e. g., a suitable solvent or mixture of solvents. Although various solvents or solvent mixtures or other liquid media may be employed, we prefer, for economic reasons and because of its eminent suitability, to use water. The reaction may be carried out under a variety of temperature and pressure conditions, for instance, at normal or at elevated temperatures and at atmospheric, sub-atmospheric or super-atmospheric pressures.

The above reaction may be represented by the following equation:

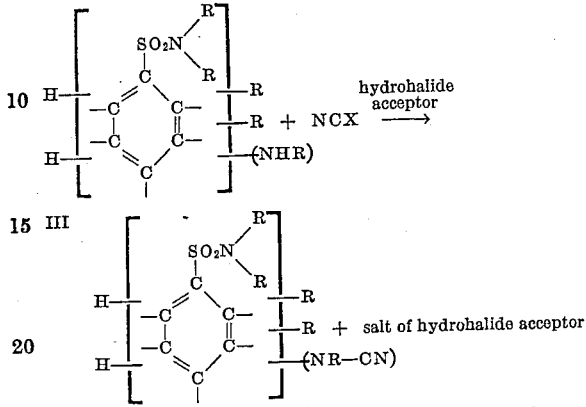

In the above equation X represents a halogen and R has the same meaning as given hereinbefore with reference to Formula I.

In order that those skilled in the art better may understand how the present invention may be carried into effect, the following examples are given by way of illustration and not by way of limitation. All parts are by weight.

*Example 1*

This example illustrates the preparation of 4-cyanoaminobenzenesulphonamide, the formula for which is

IV

| | Parts | Mol ratio |
|---|---|---|
| Sulphanilamide (4-aminobenzenesulphonamide) [1] | 412 | 2 |
| Cyanogen bromide | 124 | 1 |
| Water | 1,000 | |

[1] The excess of sulphanilamide over that required for reaction with the cyanogen bromide functions as a hydrohalide acceptor.

The sulphonamide was suspended in water and the cyanogen bromide added. The solution was shaken occasionally over a period of several hours and then was allowed to stand for about 16 hours. Two hundred parts of sodium carbonate dissolved in water were added to the reaction mixture to give a pH greater than 10.0, whereupon sulphonilamide (excess reactant) precipitated out. The precipitate was washed with 50 parts of a 33% sodium carbonate solution and then with 250 parts warm water. The filtrate and washings were combined, then strongly acidified with hydrochloric acid and cooled to 0° C. 4-cyanoaminobenzenesulphonamide crystallized out of the cooled solution. The yield was 195 parts or 80% of the theoretical. The crystalline product was further purified, including recrystallization from hot water. The recrystallized material was a white, crystalline powder melting at 183–184° C. with decomposition but no discoloration. The nitrogen analysis of the purified product checked with the nitrogen content of 4-cyanoaminobenzenesulphonamide within the limits of experimental error.

Instead of using an excess (one mol in excess of equimolecular proportions) of sulphanilamide as hydrohalide acceptor, other hydrohalide acceptors such as mentioned hereinbefore may be employed.

*Example 2*

2-cyanoaminobenzenesulphonamide is prepared in essentially the same manner as described under Example 1 with the exception that 412 parts of 2-aminobenzenesulphonamide (ortho-aminobenzenesulphonamide) are used instead of 412 parts of sulphanilamide.

*Example 3*

3-cyanoaminobenzenesulphonamide is prepared in essentially the same manner as described under Example 1 with the exception that 412 parts of 3-aminobenzenesulphonamide (meta-aminobenzenesulphonamide) are used instead of 412 parts of sulphanilamide.

*Example 4*

2-methyl 4-cyanoamino benzenesulphonamide is prepared in essentially the same manner as described under Example 1 with the exception that 445.5 parts of 2-methyl sulphanilamide (2-methyl 4-amino benzenesulphonamide) are used in place of 412 parts of sulphanilamide.

It will be readily understood by those skilled in the art from the foregoing description of the preparation of 4-cyanoaminobenzene sulphonamide, 2-cyanoaminobenzenesulphonamide (6-cyanoaminobenzenesulphonamide), 3-cyanoaminobenzenesulphonamide (5-cyanoaminobenzenesulphonamide) and 2-methyl 4-cyanoamino benzenesulphonamide (6-methyl 4-cyanoamino benzenesulphonamide) that, when other compounds of the kind embraced by Formula I are to be prepared, then the starting reactants and amounts thereof are chosen so as to yield the desired product in accordance with methods such as given above by way of illustration.

Other and more specific examples of compounds embraced by Formula I are listed below:

2-ethyl 4-cyanoamino benzenesulphonamide
2-allyl 4-cyanoamino benzenesulphonamide
3-methyl 4-cyanoamino benzenesulphonamide
3-ethyl 4-cyanoamino benzenesulphonamide
2,3-dimethyl 4-cyanoamino benzenesulphonamide
2,3-diethyl 4-cyanoamino benzenesulphonamide
2-methyl 3-ethyl 4-cyanoamino benzenesulphonamide
2-ethyl 3-methyl 4-cyanoamino benzenesulphonamide
2-cyanoamino 3-methyl benzenesulphonamide
2-cyanoamino 4-methyl benzenesulphonamide
2-methyl 3-cyanoamino benzenesulphonamide
3-cyanoamino 4-methyl benzenesulphonamide
2-cyanoamino 3,4-dimethyl benzenesulphonamide
2-cyanoamino 3,4-diethyl benzenesulphonamide
3-cyanoamino 2,4-dimethyl benzenesulphonamide
3-cyanoamino 2,4-diethyl benzenesulphonamide
2-phenyl 4-cyanoamino benzenesulphonamide
2-cyclohexyl 4-cyanoamino benzenesulphonamide
2-butenyl 4-cyanoamino benzenesulphonamide
2-ethyl 3-isopropyl 4-cyanoamino benzenesulphonamide
3-methyl 4-methylcyanoamino benzenesulphonamide
2,6-dipropyl 4-isoamylcyanoamino benzenesulphonamide
3-butenyl 5-phenyl 4-ethylcyanoamino benzenesulphonamide
2-tolyl 5-cyclohexenyl 4-propylcyanoamino benzenesulphonamide
3-isobutyl 5-methyl 4-amylcyanoamino benzenesulphonamide
2-phenyl 4-cyanoamino 6-methyl benzenesulphonamide
2-phenyl 3-cyanoamino benzenesulphonamide
3-cyanoamino 4-xenyl benzenesulphonamide
2-methylcyanoamino benzenesulphonamide
2-phenylcyanoamino benzenesulphonamide
3-ethylcyanoamino 4-methyl benzenesulphonamide
2-propylcyanoamino 3-ethyl benzenesulphonamide
2-phenylcyanoamino benzenesulphonyl-methylamide
2-cyanoamino benzenesulphonyl-methylamide
3-cyanoamino benzenesulphonyl-ethylamide
4-cyanoamino benzenesulphonyl-methylamide
4-cyanoamino benzenesulphonyl-allylamide
4-cyanoamino benzenesulphonyl-phenylamide
4-cyanoamino benzenesulphonyl-(dimethyl)-amide
2-phenyl 4-cyanoamino 6-methyl benzenesulphonamide
3-ethyl 4-isopropyl 5-cyanoamino benzenesulphonamide
3-isopropyl 4-ethylcyanoamino benzenesulphonyl-cyclohexylamide
2-methylcyanoamino benzenesulphonyl-(diethyl)-amide
3,5-dimethyl 4-cyanoamino benzenesulphonyl-benzylamide
3-phenyl 4-cyanoamino benzenesulphonyl-tolylamide
3-phenylethyl 4-cyanoamino benzenesulphonamide
2,6-dimethyl 4-methylcyanoamino benzenesulphonyl-(diphenyl)-amide
2-tolyl 4-cyanoamino benzenesulphonamide
3-phenylethyl 4-allylcyanoamino benzenesulphonyl-propylamide
2-isoamyl 4-cyanoamino 5-naphthyl benzenesulphonamide
2,6-dihexenyl 4-amylcyanoamino benzenesulphonyl-ethylamide
2-cyanoamino 3-methyl 4-ethyl benzenesulphonamide
2-cinnamyl 4-cyanoamino benzenesulphonamide From the foregoing description it will be seen that our invention provides not only new and useful chemical compounds but also a method of preparing such chemical compounds. Specific method features of the invention include the method of preparing a cyanoaminobenzenesulphonamide (monocyanoaminobenzenesulphonamide), more particularly 2-cyanoaminobenzenesulphonamide, 3-cyanoaminobenzenesulphonamide and 4-cyanoaminobenzenesulphonamide, said method comprising effecting reaction in the presence of a hydrohalide acceptor between an aminobenzenesulphonamide (monoaminobenzenesulphonamide) and a cyanogen halide, specifically cyanogen chloride or bromide, and isolating the resulting cyanoaminobenzenesulphonamide from the reaction mass. A more specific method feature of the invention is the method of preparing 4-cyanoaminobenzenesulphonamide which comprises effecting reaction in an aqueous liquid, e. g., water, between sulphanilamide and cyanogen chloride or bromide, the sulphanilamide being in excess of equimolecular proportions, and separating the resulting 4-cyanoaminobenzenesulphonamide from the reaction mass.

What we claim as new and desire to secure by Letters Patent of the United States is:

1. A cyanoaminobenzenesulphonamide.
2. 2-cyanoaminobenzenesulphonamide.
3. 3-cyanoaminobenzenesulphonamide.
4. 4-cyanoaminobenzenesulphonamide.
5. The method of preparing a cyanoaminobenzenesulphonamide which comprises effecting reaction in the presence of a hydrohalide acceptor between an aminobenzenesulphonamide and cyanogen chloride, and isolating the resulting cyanoaminobenzenesulphonamide from the reaction mass.
6. The method of preparing a cyanoaminobenzenesulphonamide which comprises effecting reaction in the presence of a hydrohalide acceptor between an aminobenzenesulphonamide and cyanogen bromide, and isolating the resulting cyanoaminobenzenesulphonamide from the reaction mass.
7. The method of preparing 4-cyanoaminobenzenesulphonamide which comprises effecting reaction in the presence of a hydrohalide acceptor between sulphanilamide and cyanogen chloride, and isolating the resulting 4-cyanoaminobenzenesulphonamide from the reaction mass.
8. The method of preparing 4-cyanoaminobenzenesulphonamide which comprises effecting reaction in the presence of a hydrohalide acceptor between sulphanilamide and cyanogen bromide, and isolating the resulting 4-cyanoaminobenzenesulphonamide from the reaction mass.
9. The method of preparing 4-cyanoaminobenzenesulphonamide which comprises effecting reaction in an aqueous liquid between sulphanilamide and cyanogen bromide, the sulphanilamide being in excess of equimolecular proportions, and separating the resulting 4-cyanoaminobenzenesulphonamide from the reaction mass.
10. The method of preparing 4-cyanoaminobenzenesulphonamide which comprises effecting reaction between cyanogen bromide and an aqueous suspension of sulphanilamide, the sulphanilamide being in excess of equimolecular proportions, converting the reaction mixture to a pH greater than 10, separating the resulting precipitate, acidifying the precipitate-free solution, crystallizing impure 4-cyanoaminobenzenesulphonamide from the acidified solution, and purifying the impure crystals of 4-cyanoaminobenzenesulphonamide.
11. The method of preparing 4-cyanoaminobenzenesulphonamide which comprises suspending sulphanilamide in water, adding cyanogen bromide thereto in an amount corresponding to one mol of cyanogen bromide for each two mols of sulphanilamide, agitating the resulting solution for a period of several hours and then allowing it to stand undisturbed for about 16 hours thereby to effect reaction between the reactants, converting the reaction mixture to a pH greater than 10 by adding thereto an aqueous solution of sodium carbonate, separating the resulting precipitate, acidifying the precipitate-free liquid mass with hydrochloric acid, cooling the acidified liquid mass to a temperature of the order of 0° C., separating impure crystals of 4-cyanoaminobenzenesulphonamide from the cooled liquid mass, and purifying the impure crystals of 4-cyanoaminobenzenesulphonamide.

GAETANO F. D'ALELIO.
JAMES J. PYLE.

CERTIFICATE OF CORRECTION.

Patent No. 2,388,529. November 6, 1945.

GAETANO F. D'ALELIO, ET AL.

It is hereby certified that error appears in the printed specification of the above numbered patent requiring correction as follows: Page 1, first column, line 12, for that portion of the formula reading "2C" read -- 2C-- --; page 2, second column, line 54, for "sulphonamide" read --sulphanilamide--; line 61, for "sulphonilamide" read --sulphanilamide--; and that the said Letters Patent should be read with this correction therein that the same may conform to the record of the case in the Patent Office.

Signed and sealed this 26th day of February, A. D. 1946.

Leslie Frazer (Seal) First Assistant Commissioner of Patents.